US010193881B2

(12) United States Patent
Ozeki et al.

(10) Patent No.: US 10,193,881 B2
(45) Date of Patent: Jan. 29, 2019

(54) METHOD FOR CONTROLLING INFORMATION TERMINAL IN COOPERATION WITH WEARABLE TERMINAL

(71) Applicant: Panasonic Intellectual Property Corporation of America, Torrance, CA (US)

(72) Inventors: Akinori Ozeki, Osaka (JP); Tetsuji Fuchikami, Osaka (JP); Kazuki Funase, Osaka (JP); Hideshi Aoki, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 133 days.

(21) Appl. No.: 15/220,370

(22) Filed: Jul. 26, 2016

(65) Prior Publication Data
US 2017/0063738 A1    Mar. 2, 2017

(30) Foreign Application Priority Data

Aug. 31, 2015   (JP) ................................. 2015-171534
Mar. 17, 2016   (JP) ................................. 2016-054091

(51) Int. Cl.
H04L 29/06      (2006.01)
H04W 4/80       (2018.01)
(Continued)

(52) U.S. Cl.
CPC .............. H04L 63/083 (2013.01); G06F 3/14 (2013.01); H04B 1/385 (2013.01); H04L 51/02 (2013.01);
(Continued)

(58) Field of Classification Search
CPC ... G06F 3/04817; G06F 3/14; G09G 2354/00; G09G 2341/00; H04B 1/385; H04L 51/04; H04L 63/083; H04W 12/08
See application file for complete search history.

(56) References Cited

U.S. PATENT DOCUMENTS

2013/0271495 A1* 10/2013 Nguyen ............... G04G 17/083
                                            345/649
2014/0194064 A1*  7/2014 Murakami .............. H04W 4/80
                                            455/41.2
(Continued)

FOREIGN PATENT DOCUMENTS

JP    2014-134903    7/2014
JP    2015-041829    3/2015

Primary Examiner — Alina A Boutah
(74) Attorney, Agent, or Firm — Greenblum & Bernstein, P.L.C.

(57) ABSTRACT

A method is provided for controlling interaction among an information terminal, an electronic mail server, and a wearable terminal. The method causes an information terminal to receive electronic mail from an electronic mail server by using a mail application for executing transmission and reception of the electronic mail, the mail application being stored in a memory of the information terminal. The method also causes the information terminal to transfer the received electronic mail to a wearable terminal having a second display, and to receive viewing information from the wearable terminal, the viewing information indicating that the electronic mail was displayed on the second display. The method further causes the information terminal to determine whether the electronic mail is being displayed on the second display, and to automatically display, on the first display, a reply-mail creation screen for creating a reply mail to the electronic mail.

17 Claims, 15 Drawing Sheets

(51) Int. Cl.
*H04B 1/3827* (2015.01)
*G06F 3/14* (2006.01)
*H04L 12/58* (2006.01)
*H04W 4/12* (2009.01)
*G06F 1/16* (2006.01)

(52) U.S. Cl.
CPC .............. *H04W 4/12* (2013.01); *H04W 4/80* (2018.02); *G06F 1/163* (2013.01); *G09G 2354/00* (2013.01); *G09G 2370/022* (2013.01); *G09G 2370/16* (2013.01); *H04L 51/14* (2013.01)

(56) References Cited

U.S. PATENT DOCUMENTS

| | | | |
|---|---|---|---|
| 2015/0348495 A1* | 12/2015 | Kim | G06F 3/0484 345/156 |
| 2015/0350403 A1* | 12/2015 | Eim | G06F 1/163 455/420 |
| 2016/0037346 A1* | 2/2016 | Boettcher | H04M 1/72519 455/411 |
| 2016/0048298 A1* | 2/2016 | Choi | G06F 3/04842 715/846 |
| 2016/0283020 A1* | 9/2016 | Heo | G06F 3/0416 |
| 2016/0379205 A1* | 12/2016 | Margadoudakis | G06Q 20/327 705/71 |
| 2017/0003931 A1* | 1/2017 | Dvortsov | G11B 27/11 |
| 2017/0038847 A1* | 2/2017 | Schorsch | G06F 3/017 |
| 2017/0289329 A1* | 10/2017 | Yim | G06F 3/048 |
| 2018/0166044 A1* | 6/2018 | Heo | G06F 3/14 |

* cited by examiner

METHOD FOR CONTROLLING INFORMATION TERMINAL IN COOPERATION WITH WEARABLE TERMINAL

BACKGROUND

1. Technical Field

The present disclosure relates to a control method for an information terminal, an information display system, a wearable terminal, and a non-transitory storage medium.

2. Description of the Related Art

In recent years, wearable terminals that are worn on portions of users' bodies and are used in cooperation with information terminals, such as smartphones or tablet computers, have attracted attention (see for example, Japanese Unexamined Patent Application Publication No. 2015-41829 and Japanese Unexamined Patent Application Publication No. 2014-134903). Through cooperation with each corresponding information terminal or wearable terminal, information sent from a network to the information terminal can be transferred to the wearable terminal, and the transferred information can be displayed on the wearable terminal. This allows the user to view, on the wearable terminal, the information sent to the information terminal without having to take out the information terminal from his or her bag, clothing pocket, or the like.

Nevertheless, the information terminals disclosed in Japanese Unexamined Patent Application Publication No. 2015-41829 and Japanese Unexamined Patent Application Publication No. 2014-134903 have a problem that operability when they are used in cooperation with wearable terminals cannot be said to be high.

SUMMARY

One non-limiting and exemplary embodiment provides an information terminal control method, an information display system, a wearable terminal, and a program that can enhance operability.

In one general aspect, the techniques disclosed here feature a control method for an information terminal that is capable of communicating with an electronic mail server and that is capable of communicating with a wearable terminal used while being worn on a portion of a user's body, the information terminal having a first display, and the wearable terminal having a second display. The method causes a computer of the information terminal to: receive electronic mail from the electronic mail server by using a mail application for executing transmission and reception of the electronic mail, the mail application being stored in a memory of the information terminal; transfer the received electronic mail to the wearable terminal; receive viewing information from the wearable terminal, the viewing information indicating that the electronic mail was displayed on the second display at a time; determine whether or not the electronic mail is being displayed on the second display, based on the viewing information; and automatically display, on the first display, a reply-mail creation screen for creating a reply mail to the electronic mail that was displayed on the second display at the time, when it is determined that the electronic mail is being displayed on the second display, and the computer of the information terminal launches the mail application.

The information terminal control method according to one aspect of the present disclosure can enhance operability.

It should be noted that general or specific embodiments may be implemented as a system, a method, an integrated circuit, a computer program, a computer-readable storage medium such as a compact disc read-only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION (Findings Underlying Present Disclosure)

Figure 1:
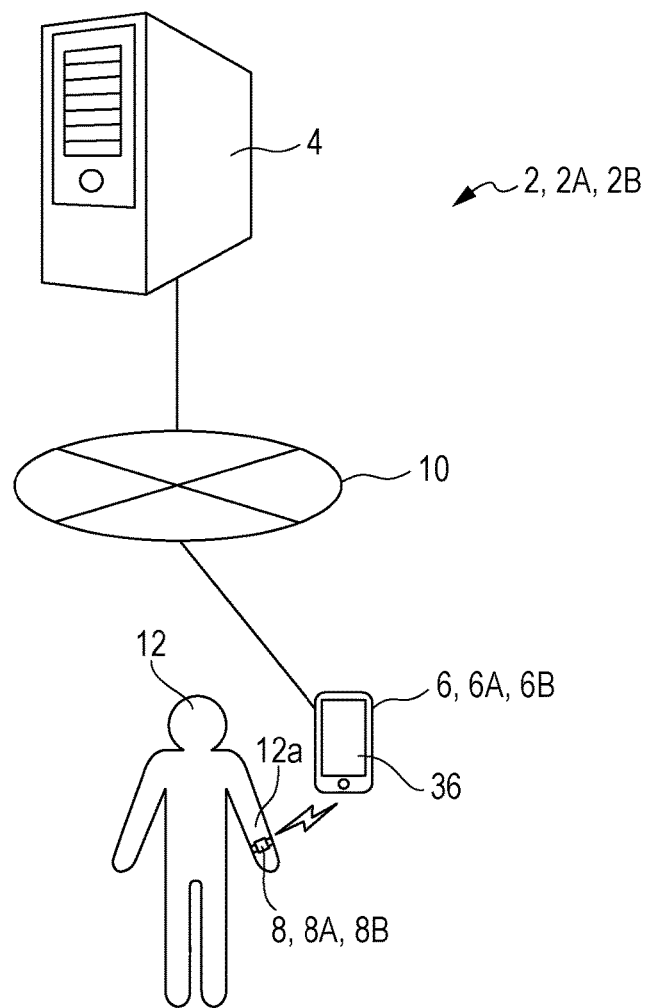
FIG. 1 is a diagram illustrating the overall configuration of an information display system according to first (second, and third) embodiments.

The present inventors have found that the technologies described in the section "Description of the Related Art" cause the following problems.

Nowadays, wristwatch-type wearable terminals that are used while being worn on users upper limbs are coming into widespread use. Such a wristwatch-type wearable terminal has a display at a portion corresponding to the face of a typical wristwatch, and information transferred from an information terminal is displayed on the display. Since the information can be viewed with the wearable terminal in the same manner as checking the time with a wristwatch, it is not necessary to take out the information terminal from his or her bag, clothing pocket, or the like in order to view the information.

However, the size of the display of the wristwatch-type wearable terminal is inevitably restricted to a size (e.g., 2 inches or smaller) that can be worn on an upper limb of the user. Thus, for example, when a small-size touch panel display is employed as an input device for the wristwatch-type wearable terminal, it is difficult to input text by using the touch panel display. In view of such a problem, for example, Japanese Unexamined Patent Application Publication No. 2015-41829 and Japanese Unexamined Patent Application Publication No. 2014-134903 disclose technologies.

In the technology disclosed in Japanese Unexamined Patent Application Publication No. 2015-41829, a mobile phone in the possession of a user and wearable equipment worn on the user's body are made to cooperate with each other. In Japanese Unexamined Patent Application Publication No. 2015-41829, message data created by the wearable equipment is transmitted to other equipment via the mobile phone. The message data created by the wearable equipment is image data and does not include character information. The user selects arbitrary image data from a plurality of pieces of image data pre-stored in the wearable equipment, to thereby create message data.

In the technology disclosed in Japanese Unexamined Patent Application Publication No. 2014-134903, a transmitting/receiving device, such as a smartphone, and a wristwatch-type device worn on a user's body are made to cooperate with each other. In Japanese Unexamined Patent Application Publication No. 2014-134903, a message received by the transmitting/receiving device is transferred to the wristwatch-type device, so that the message is displayed on the wristwatch-type device. The transmitting/receiving device generates a plurality of candidates of a reply message in accordance with the content of the received message and causes the wristwatch-type device to display the generated reply-message candidates. The user selects an arbitrary reply message from the reply-message candidates displayed on the wristwatch-type device, to thereby create a reply message.

Thus, the technologies disclosed in Japanese Unexamined Patent Application Publication No. 2015-41829 and Japanese Unexamined Patent Application Publication No. 2014-134903 make it possible to create a message without performing an operation for inputting text with the wearable terminal.

Also, for example, there are cases in which, when a user views an electronic mail with a wearable terminal, he or she wishes to create long text as a reply mail to the electronic mail. Since such cases cannot be dealt with by the technologies disclosed in Japanese Unexamined Patent Application Publication No. 2015-41829 and Japanese Unexamined Patent Application Publication No. 2014-134903, it is necessary to create the reply mail by using an information terminal, such as a smartphone.

In this case, in order to create the reply mail by using the information terminal, the user has to launch a mail application for executing transmission and reception of electronic mail, after releasing the locked state of the information terminal. In addition, after searching for and specifying an electronic mail to which a reply is to be made (i.e., an electronic mail displayed on the wearable terminal) among a plurality of electronic mails stored in the mail application, the user has to cause a reply-mail creation screen, used for creating a reply mail, to be displayed on the information terminal, by performing an operation for making a reply to the specified electronic mail.

Thus, when the user wishes to create, using the information terminal, a reply mail to an electronic mail displayed on the wearable terminal, he or she has to perform a number of operations on the information terminal, which is cumbersome. Accordingly, there is a problem in that the operability cannot be said to be high.

In order to overcome such a problem, a control method for an information terminal according to the present disclosure is directed to a control method for an information terminal that is capable of communicating with an electronic mail server and that is capable of communicating with a wearable terminal used while being worn on a portion of a user's body, the information terminal having a first display, and the wearable terminal having a second display. The method causes a computer of the information terminal to: receive electronic mail from the electronic mail server by using a mail application for executing transmission and reception of the electronic mail, the mail application being stored in a memory of the information terminal; transfer the received electronic mail to the wearable terminal; receive viewing information from the wearable terminal, the viewing information indicating that the electronic mail was displayed on the second display at a time; determine whether or not the electronic mail is being displayed on the second display, based on the viewing information; and automatically display, on the first display, a reply-mail creation screen for creating a reply mail to the electronic mail that was displayed on the second display at the time, when it is determined that the electronic mail is being displayed on the second display, and the computer of the information terminal launches the mail application.

According to this aspect, a determination as to whether or not the electronic mail is being displayed on the second display is made based on the viewing information transmitted from the wearable terminal. When it is determined that the electronic mail is being displayed on the second display, and the computer of the information terminal launches the mail application, a reply-mail creation screen for creating a reply mail to the electronic mail that was displayed on the second display at the time is automatically displayed on the first display. Thus, for example, when the user wishes to create a reply mail with the information terminal in response to an electronic mail he or she is viewing on the wearable terminal, it is possible to display the reply-mail creation screen on the first display of the information terminal without performing a number of operations on the information terminal. Also, since the effort for searching the mail application in the information terminal for the electronic mail the user is viewing on the wearable terminal becomes unnecessary, it is possible to reduce the time from viewing the electronic mail on the wearable terminal until creating a reply mail on the reply-mail creation screen, thus making it possible to enhance the operability of the information terminal. The expression "when the mail application is launched" as used herein includes not only the time that is simultaneous with the launch of the mail application but also the time when a predetermined time (e.g., a few seconds) passes after the mail application is launched.

For example, when it is determined in the displaying of the reply-mail creation screen that the electronic mail is being displayed on the second display, and a first operation for releasing a locked state in which an operation on the information terminal is disabled is received, the computer of the information terminal may launch the mail application and automatically display the reply-mail creation screen on the first display.

According to this aspect, upon being triggered by the user performing the operation (the first operation) for releasing the locked state of the information terminal, the reply-mail creation screen is displayed on the first display. Accordingly, the user can smoothly launch the reply-mail creation screen by performing only a single operation after taking out the information terminal from his or her bag or the like.

For example, a passcode for releasing the locked state may be further stored in the memory, and the first operation may be an operation for inputting a passcode in the information terminal. In the displaying of the reply-mail creation screen, when the passcode stored in the memory and the passcode input by the first operation match each other, the locked state may be released.

According to this aspect, when the user inputs a correct passcode, the locked state of the information terminal is released, and the reply-mail creation screen is displayed on the first display. Accordingly, this arrangement can suppress an event in which an erroneous operation releases the locked state of the information terminal to display the reply-mail creation screen on the first display.

For example, when it is determined in the displaying of the reply-mail creation screen that the electronic mail is being displayed on the second display, and a second operation for launching the mail application is received, the computer of the information terminal may launch the mail application and automatically display the reply-mail creation screen on the first display.

According to this aspect, upon being triggered by the user performing the operation (the second operation) for launching the mail application, the reply-mail creation screen is displayed on the first display. Accordingly, when the user is clearly willing to perform an operation on the electronic mail, the reply-mail creation screen is displayed. Thus, for example, when the user wishes to launch another application before creating a reply mail, preventing the user's operation can be suppressed.

For example, the second operation may specify an icon for launching the mail application, the icon being displayed on the first display.

According to this aspect, by specifying the icon displayed on the first display, the user can launch the mail application.

For example, in the determining of whether or not the electronic mail is being displayed on the second display, it may be determined that electronic mail is displayed on the second display, until a predetermined time passes after the viewing information is received.

According to this aspect, it is possible to easily determine whether or not the electronic mail is displayed on the second display.

For example, the control method may further cause the computer of the information terminal to receive viewing finish information from the wearable terminal after receiving the viewing information, the viewing finish information indicating that the display of the electronic mail on the second display is finished. In the determining of whether or not the electronic mail is being displayed on the second display, it may be determined that the electronic mail is displayed on the second display, until the viewing finish information is received after the viewing information is received.

According to this aspect, it is possible to accurately determine whether or not the electronic mail is displayed on the second display.

For example, in the receiving of the viewing information, the viewing information may be periodically received while the electronic mail is being displayed on the second display.

According to this aspect, it is possible to accurately determine whether or not the electronic mail is displayed on the second display.

For example, the reply-mail creation screen may have a destination-address input field for inputting a mail address that is a destination address of a reply mail, and in the displaying of the reply-mail creation screen, the reply-mail creation screen may be displayed on the first display, with a mail address of a transmission source of the electronic mail displayed on the second display being input in the destination-address input field.

According to this aspect, the reply-mail creation screen is displayed on the first display, with a mail address of a transmission source of the electronic mail displayed on the second display being pre-input in the destination-address input field. This allows the user to save the effort of performing an operation for inputting the destination address of a reply mail, thus making it possible to further enhance the operability.

For example, in the displaying of the reply-mail creation screen, when a destination address of the electronic mail displayed on the second display includes a plurality of mail addresses, the reply-mail creation screen may be displayed on the first display, with one or more mail addresses other than a mail address corresponding to the information terminal among the plurality of mail addresses being input in the destination-address input field.

According to this aspect, the reply-mail creation screen is displayed on the first display, with the destination mail address(es) other than the mail address corresponding to the information terminal being pre-input in the destination-address input field, in addition to the mail address of the transmission source of the electronic mail displayed on the second display. This allows the user to save the effort of performing an operation for inputting a plurality of destination addresses of a reply mail, thus making it possible to further enhance the operability.

For example, the reply-mail creation screen may have a subject input field for inputting a subject of a reply mail, and in the displaying of the reply-mail creation screen, the reply-mail creation screen may be displayed on the first display, with a subject of the electronic mail displayed on at least the second display being input in the subject input field.

According to this aspect, the reply-mail creation screen is displayed on the first display, with a subject of the electronic mail displayed on the second display being input in the subject input field. This allows the user to save the effort of performing an operation for inputting the subject of a reply mail, thus making it possible to further enhance the operability.

For example, the reply-mail creation screen may have a body-text input field for inputting body text of a reply mail; and in the displaying of the reply-mail creation screen, the reply-mail creation screen may be displayed on the first display, with body text of the electronic mail displayed on the second display being input in the body-text input field in a quoted form.

According to this aspect, the reply-mail creation screen is displayed on the first display screen, with the body text of the electronic mail displayed on the second display being input in the body-text input field in a quoted form. This makes it possible to enhance convenience when the user creates body text of a reply mail.

For example, the control method may further cause the computer of the information terminal to: receive, from the wearable terminal, an operation command for giving an instruction for displaying the reply-mail creation screen on the first display; and automatically display the reply-mail creation screen on the first display after the computer of the information terminal launches the mail application, when the operation command is received.

According to this aspect, the reply-mail creation screen is displayed on the first display of the information terminal in response to an instruction from the wearable terminal. Accordingly, for example, while viewing the electronic mail on the wearable terminal, the user can display the reply-mail creation screen on the first display by performing a predetermined operation on the wearable terminal.

Also, an information display system according to one aspect of the present disclosure is directed to an information display system including: an information terminal that is capable of communicating with an electronic mail server; and a wearable terminal that is used while being worn on a portion of a users body and that is capable of communicating with the information terminal. The information terminal includes a first display, a memory that stores therein a mail application for executing transmission and reception of electronic mail, a first receiver that receives the electronic mail from the electronic mail server by using the mail application, and a transferer that transfers the received electronic mail to the wearable terminal. The wearable terminal includes: a second receiver that receives the electronic mail from the information terminal; a second display that displays the received electronic mail; and a transmitter that transmits viewing information to the information terminal, the viewing information indicating that the electronic mail is was displayed on the second display at a time. The information terminal further includes: a third receiver that receives the viewing information from the wearable terminal; a determiner that determines whether or not the electronic mail is being displayed on the second display of the wearable terminal, based on the viewing information; and a controller that automatically displays, on the first display, a reply-mail creation screen for creating a reply mail to the electronic mail that was displayed on the second display at the time, when it is determined that the electronic mail is being displayed on the second display of the wearable terminal, and the computer of the information terminal launches the mail application.

According to this aspect, for example, when the user wishes to create a reply mail with the information terminal in response to an electronic mail he or she is viewing on the wearable terminal, it is possible to display the reply-mail creation screen on the first display of the information terminal without performing a number of operations on the information terminal. Also, since the effort for searching the mail application in the information terminal for the electronic mail the user is viewing on the wearable terminal becomes unnecessary, it is possible to reduce the time from viewing the electronic mail on the wearable terminal until creating a reply mail on the reply-mail creation screen, thus making it possible to enhance the operability of the information terminal.

In addition, a wearable terminal according to one aspect of the present disclosure is used in the above-described information display system.

For example, the transmitter in the wearable terminal may further transmit, to the information terminal, an operation command for giving an instruction for displaying the reply-mail creation screen on the first display.

According to this aspect, according to this aspect, the reply-mail creation screen is displayed on the first display of the information terminal in response to an instruction from the wearable terminal. Accordingly, for example, while viewing the electronic mail on the wearable terminal, the user can display the reply-mail creation screen on the first display by performing a predetermined operation on the wearable terminal.

A program according to one aspect of the present disclosure is directed to a program for controlling an information terminal that is capable of communicating with an electronic mail server and that is capable of communicating with a wearable terminal used while being worn on a portion of a user's body, the information terminal having a first display, and the wearable terminal having a second display. The program causes a computer of the information terminal to: receive electronic mail from the electronic mail server by using a mail application for executing transmission and reception of the electronic mail, the mail application being stored in a memory of the information terminal; transfer the received electronic mail to the wearable terminal; receive viewing information from the wearable terminal, the viewing information indicating that the electronic mail was displayed on the second display at a time; determination whether or not the electronic mail is being displayed on the second display, based on the viewing information; and automatically display, on the first display, a reply-mail creation screen for creating a reply mail to the electronic mail that was displayed on the second display at the time, when it is determined that the electronic mail is being displayed on the second display, and the computer of the information terminal launches the mail application.

According to this aspect, for example, when the user wishes to create a reply mail with the information terminal in response to an electronic mail he or she is viewing on the wearable terminal, it is possible to display the reply-mail creation screen on the first display of the information terminal without performing a number of operations on the information terminal. Also, since the effort for searching the mail application in the information terminal for the electronic mail the user is viewing on the wearable terminal becomes unnecessary, it is possible to reduce the time from viewing the electronic mail on the wearable terminal until creating a reply mail on the reply-mail creation screen, thus making it possible to enhance the operability of the information terminal.

It should be noted that general or specific embodiments may be implemented as a system, a method, an integrated circuit, a computer program, a computer-readable storage medium such as a CD-ROM, or any selective combination thereof.

Embodiments will be described below in detail with reference to the accompanying drawings.

The embodiments described below each represent a general or specific example. Numerical values, shapes, materials, constituent elements, the arrangement and connection of constituent elements, steps, the order of steps, and so on described in the embodiments below are examples, and are not intended to limit the present disclosure. Of the constituent elements in the embodiments described below, the constituent elements not set forth in the independent claims that represent the broadest concept will be described as optional constituent elements.

First Embodiment

1-1. Overall Configuration of Information Display System

First, an overall configuration of an information display system 2 according to a first embodiment will be described with reference to FIG. 1. FIG. 1 is a diagram illustrating the overall configuration of the information display system 2 according to the first embodiment.

As illustrated in FIG. 1, the information display system 2 includes an electronic mail server 4, an information terminal 6, and a wearable terminal 8.

The electronic mail server 4 communicates with the information terminal 6 over the Internet 10 to transmit/receive information to/from the information terminal 6.

The information terminal 6 is a portable terminal operated by a user 12 and is, for example, a smartphone. The information terminal 6 communicates with the electronic mail server 4 over the Internet 10 to thereby transmit/receive information to/from the electronic mail server 4. The information terminal 6 communicates with the wearable terminal 8 via a short-range wireless communication to thereby transmit/receive information to/from the wearable terminal 8. Examples of the short-range wireless communication include a Bluetooth® communication, a wireless local area network (LAN) communication, and an infrared communication.

The wearable terminal 8 is, for example, a wristwatch-type terminal and is used while being worn on a wrist 12a (a portion of the body) of the user 12. The wearable terminal 8 communicates with the information terminal 6 via a short-range wireless communication to thereby transmit/receive information to/from the information terminal 6.

The configuration of the information terminal 6 and the configuration of the wearable terminal 8 will be described below in detail.

1-2. Configuration of Information Terminal

Figure 2:
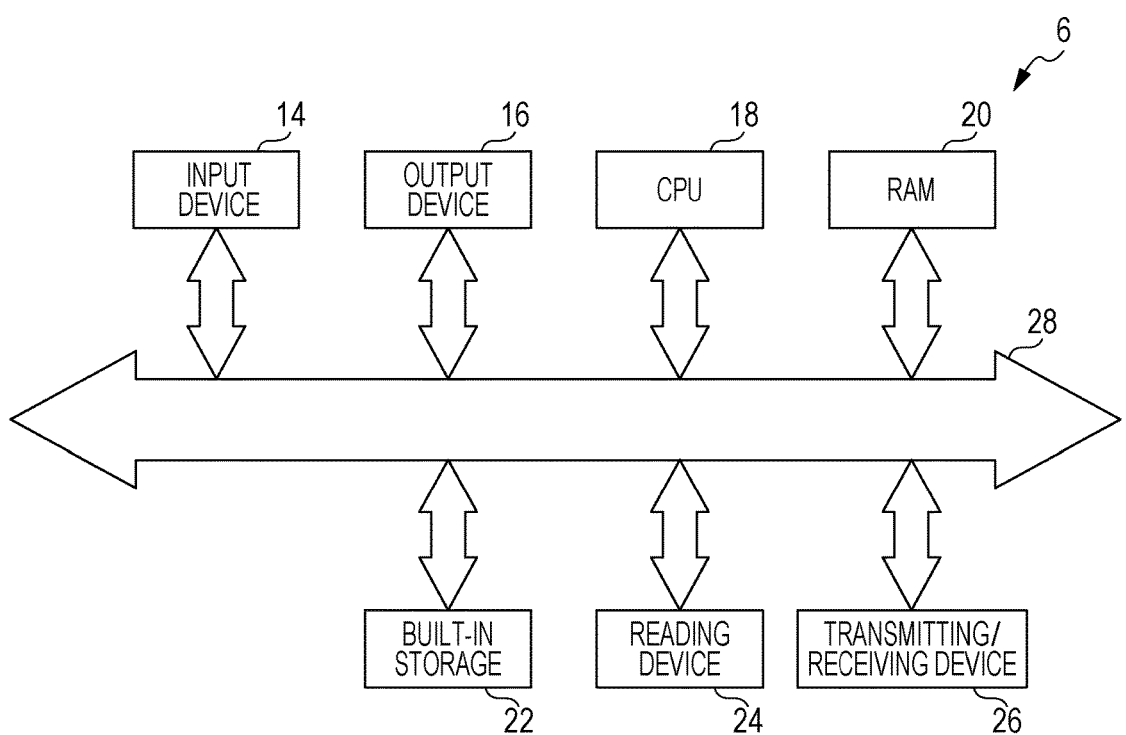
FIG. 2 is a block diagram illustrating the hardware configuration of an information terminal according to the first embodiment.
Figure 3:
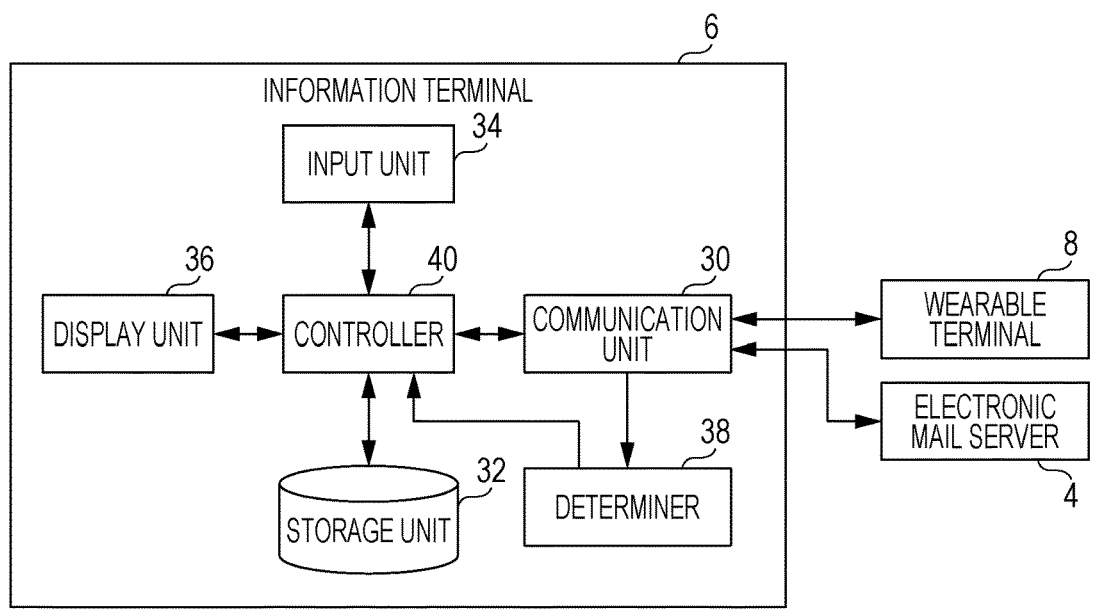
FIG. 3 is a block diagram illustrating the functional configuration of the information terminal according to the first embodiment.

Next, the configuration of the information terminal 6 will be described with reference to FIGS. 2 and 3. FIG. 2 is a block diagram illustrating the hardware configuration of the information terminal 6 according to the first embodiment. FIG. 3 is a block diagram illustrating the functional configuration of the information terminal 6 according to the first embodiment.

As illustrated in FIG. 2, the information terminal 6 is a computer having a hardware configuration that includes an input device 14, an output device 16, a central processing unit (CPU) 18, a random access memory (RAM) 20, a built-in storage 22 in which information is stored, a reading device 24 for reading information from a storage medium, such as a Universal Serial Bus (USB) memory, and a transmitting/receiving device 26 that performs communication over a network. Examples of the input device 14 include an input button and a touch panel, and examples of an output device 16 include a display and a speaker. The above-described elements are connected to each other through a bus 28.

The reading device 24 reads a program for realizing the functions of the above-described elements from a storage medium in which the program is stored, and causes the read program to be stored in the built-in storage 22. Instead of such a configuration, the transmitting/receiving device 26 may download the program for realizing the functions of the above-described elements from a server apparatus (not illustrated) by performing communication with the server apparatus over the Internet 10 and may cause the program to be stored in the built-in storage 22. Alternatively, the program for realizing the functions of the above-described elements may be pre-stored in the built-in storage 22.

The CPU 18 realizes the functions of the above-described elements by copying the program stored in the built-in storage 22 to the RAM 20, sequentially reading instructions, included in the program, from the RAM 20, and executing the instructions. Information is obtained from various types of processing when the program is executed, is stored in the RAM 20 or the built-in storage 22, and is used as appropriate.

As illustrated in FIG. 3, the information terminal 6 has a functional configuration that includes a communication unit 30 (examples of a first receiver, a third receiver, and a transferer), a storage unit 32 (one example of a memory), an input unit 34, a display unit 36 (one example of a first display), a determiner 38, and a controller 40.

The communication unit 30 is, for example, a communication adapter included in the above-described transmitting/receiving device 26. The communication unit 30 communicates with the electronic mail server 4 over the Internet 10 and communicates with the wearable terminal 8 via a short-range wireless communication. For example, the communication unit 30 transmits/receives electronic mail to/from the electronic mail server 4. Also, for example, the communication unit 30 transfers the electronic mail, received from the electronic mail server 4, to the wearable terminal 8 and receives viewing information (described below) transmitted from the wearable terminal 8.

The storage unit 32 is, for example, a semiconductor memory included in the above-described built-in storage 22 and stores various types of data therein. For example, the storage unit 32 stores a mail application and electronic mail received using the mail application. The mail application is an application program for executing transmission and reception of electronic mail.

The input unit 34 is, for example, a touch panel included in the above described input device 14 and receives various operations performed by the user 12. For example, the input unit 34 receives, for example, an operation, performed by the user 12, for launching the mail application.

The display unit 36 is, for example, a liquid-crystal panel (a touch panel display) included in the above-described output device 16 and displays various screens.

The determiner 38 is included in the above-described CPU 18. Based on the viewing information received by the communication unit 30, the determiner 38 determines whether or not electronic mail is displayed on the wearable terminal 8. A method for the determination made by the determiner 38 is described later.

The controller 40 is included in the above-described CPU 18 and controls what is displayed on the display unit 36. For example, when the input unit 34 receives an operation, performed by the user 12, for launching the mail application, the controller 40 causes a reply-mail creation screen 62 (see FIG. 10(b) described below) to be automatically displayed on the display unit 36 after launching the mail application, based on a result of the determination made by the determiner 38. The reply-mail creation screen 62 is described later.

By controlling the communication unit 30, the controller 40 controls communication with the electronic mail server 4 and communication with the wearable terminal 8. For example, the controller 40 controls the communication unit 30 so that it transmits/receives electronic mail to/from the electronic mail server 4.

1-3. Configuration of Wearable Terminal

Figure 4:
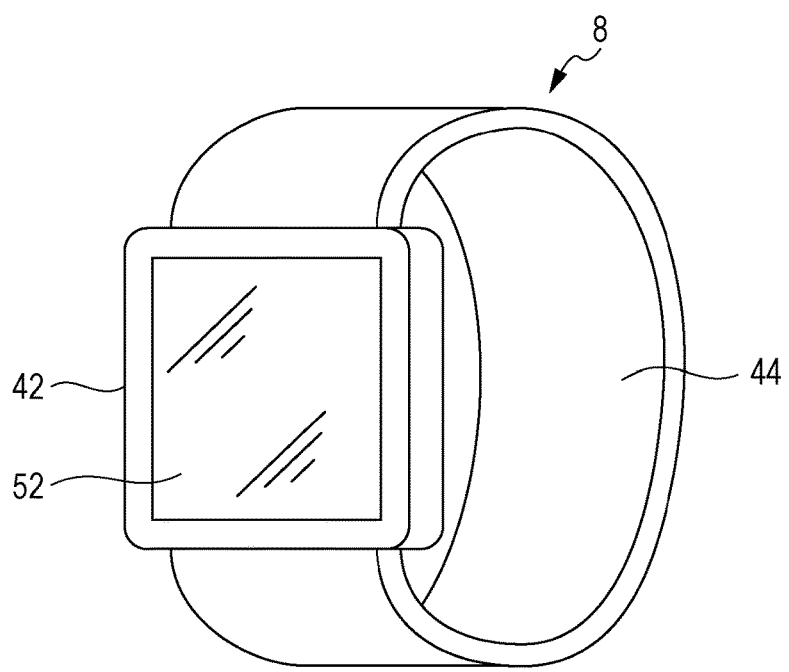
FIG. 4 is a perspective view of the external appearance of a wearable terminal according to the first embodiment.
Figure 5:
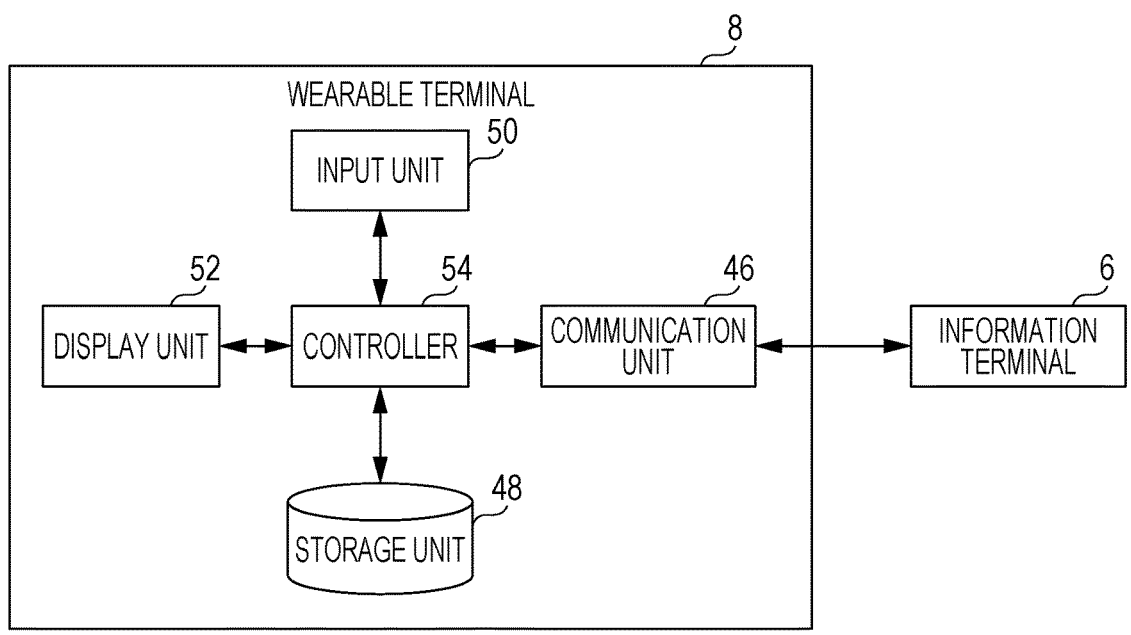
FIG. 5 is a block diagram illustrating the functional configuration of the wearable terminal according to the first embodiment.

Next, the configuration of the wearable terminal 8 will be described with reference to FIGS. 1, 4, and 5. FIG. 4 is a perspective view of the external appearance of the wearable terminal 8 according to the first embodiment. FIG. 5 is a block diagram illustrating the functional configuration of the wearable terminal 8 according to the first embodiment.

As illustrated in FIG. 4, the wearable terminal 8 includes a terminal main unit 42 and an annular band 44 connected to the terminal main unit 42. The terminal main unit 42 has a generally cuboid shape and has a display unit 52 (described below) on its surface. As illustrated in FIG. 1, the band 44 is worn on the wrist 12a of the user 12, similarly to a typical wristwatch band.

As illustrated in FIG. 5, the wearable terminal 8 has a functional configuration including a communication unit 46 (an example of a transmitter and a second receiver), a storage unit 48, an input unit 50, the aforementioned display unit 52 (one example of a second display), and a controller 54.

The communication unit 46 is a communication adapter that communicates with the information terminal 6 via a short-range wireless communication. For example, the communication unit 46 receives electronic mail transferred from the information terminal 6. Also, for example, during display of electronic mail on the display unit 52, the communication unit 46 transmits viewing information associated with the electronic mail to the information terminal 6 periodically (e.g., every 5 seconds). The viewing information indicates that electronic mail is displayed on the display unit 52. The viewing information includes identification information (e.g., reception date and time) of the electronic mail displayed on the display unit 52 and is associated with the electronic mail on a one-to-one basis.

The storage unit 48 is, for example, a semiconductor memory and stores various types of data therein. For example, the storage unit 48 stores electronic mail transferred from the information terminal 6.

The input unit 50 is, for example, a touch panel and receives various operations performed by the user 12. The input unit 50 receives, for example, an operation, performed by the user 12, for displaying electronic mail.

The display unit 52 is, for example, a liquid-crystal panel (a touch panel display) and displays various screens.

The controller 54 controls what is displayed on the display unit 52. For example, when the input unit 50 receives an operation, performed by the user 12, for displaying electronic mail, the controller 54 causes a mail viewing screen 56 to be displayed on the display unit 52. The mail viewing screen 56 is described later with reference to FIG. 8.

The controller 54 also controls communication with the information terminal 6 by controlling the communication unit 46. For example, during display of electronic mail on the display unit 52, the controller 54 controls the communication unit 46 so as to periodically transmit viewing information associated with the electronic mail to the information terminal 6.

1-4. Electronic-Mail Transmission and Reception Processing

Figure 6:
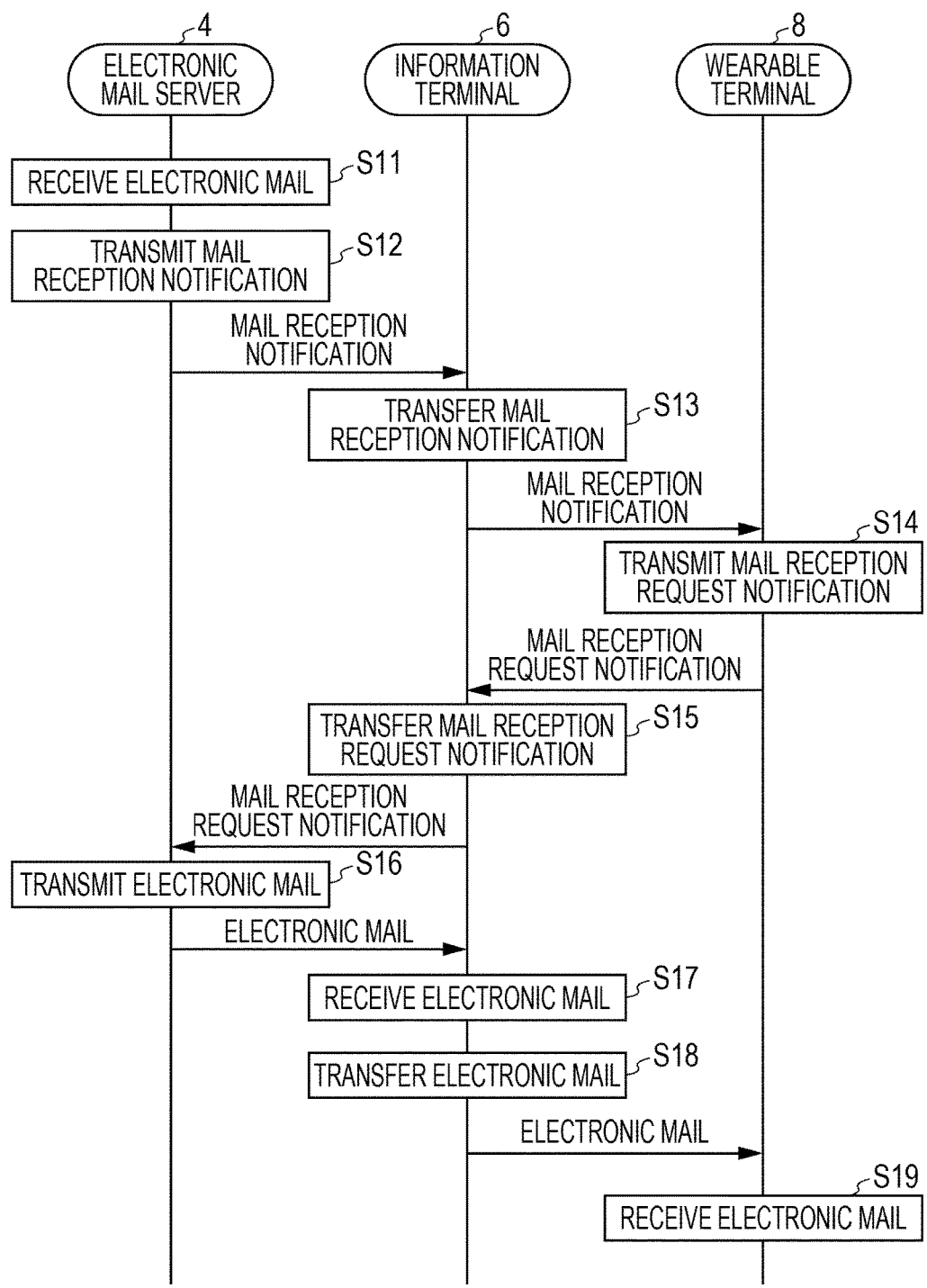
FIG. 6 is a sequence diagram illustrating the flow of electronic-mail transmission and reception processing in the information display system according to the first embodiment.

Next, electronic-mail transmission and reception processing (a method for controlling the information terminal 6) in the information display system 2 according to the first embodiment will be described with reference to FIG. 6. This transmission and reception processing is executed by the computer of the like in the information terminal 6. FIG. 6 is a sequence diagram illustrating the flow of the electronic-mail transmission and reception processing in the information display system 2 according to the first embodiment.

As illustrated in FIG. 6, the electronic mail server 4 receives an electronic mail whose destination address is a mail address corresponding to the information terminal 6 (step S11) and then transmits a mail reception notification to the information terminal 6 (step S12). The mail reception notification indicates that the electronic mail is received. After receiving the mail reception notification, the information terminal 6 transfers the received mail reception notification to the wearable terminal 8 (step S13).

After receiving the mail reception notification, the wearable terminal 8 transmits a mail reception request notification to the information terminal 6 (step S14). The mail reception request notification is a notification for requesting reception of the electronic mail. After receiving the mail reception request notification, the information terminal 6 transfers the received mail reception request notification to the electronic mail server 4 (step S15).

After receiving the mail reception request notification, the electronic mail server 4 transmits the electronic mail received in step S11 to the information terminal 6, based on the mail reception request notification (step S16). The information terminal 6 receives the electronic mail from the electronic mail server 4 (step S17) and then transfers the received electronic mail to the wearable terminal 8 (step S18). Thus, the wearable terminal 8 receives the electronic mail transferred from the information terminal 6 (step S19). The electronic mail received by the information terminal 6 is stored in the storage unit 32, and the electronic mail received by the wearable terminal 8 is stored in the storage unit 48. In step S18, a plurality of received electronic mails may be transferred to the wearable terminal 8.

Although, in the first embodiment, the electronic mail server 4 transmits the mail reception notification to only the information terminal 6 in step S12, the electronic mail server 4 may transmit the mail reception notification to both the information terminal 6 and the wearable terminal 8. In such a case, the electronic mail server 4 and the wearable terminal 8 communicate with each other over the Internet 10. Also, in step S14, after receiving the mail reception notification, the wearable terminal 8 may also transmit the mail reception request notification to the electronic mail server 4. In addition, in step S16, based on the mail reception request notification, the electronic mail server 4 may transmit the electronic mail received in step S11 to the information terminal 6 and the wearable terminal 8.

1-5. Processing for Displaying Reply-Mail Creation Screen

Figure 7:
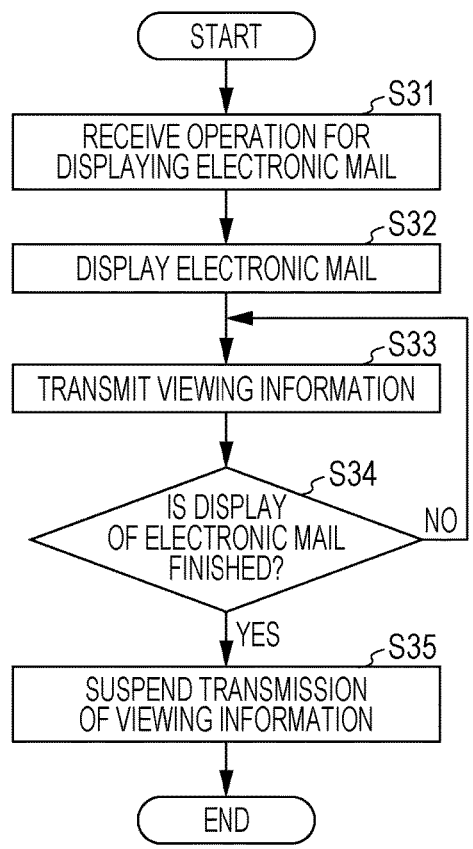
FIG. 7 is a flowchart illustrating the flow of electronic-mail display processing in the wearable terminal according to the first embodiment.
Figure 8:
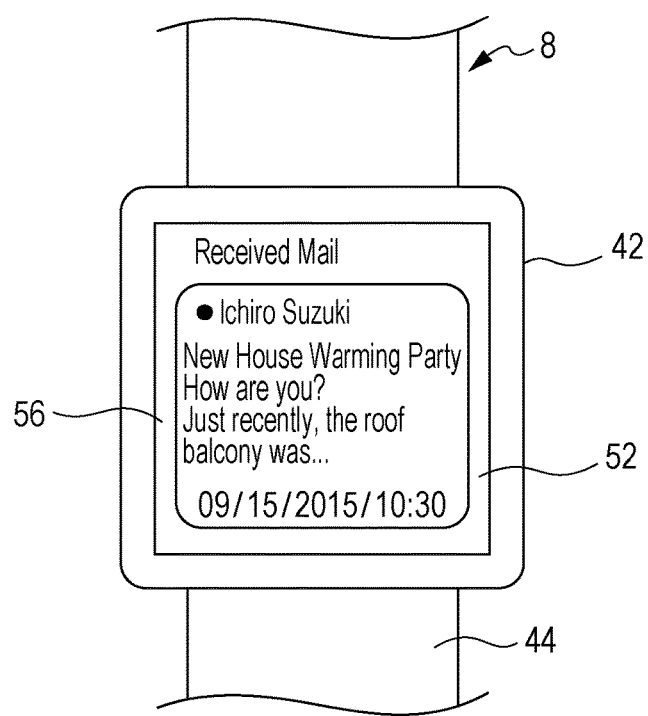
FIG. 8 is a view of one example of a mail viewing screen displayed on a display unit of the wearable terminal according to the first embodiment.
Figure 9:
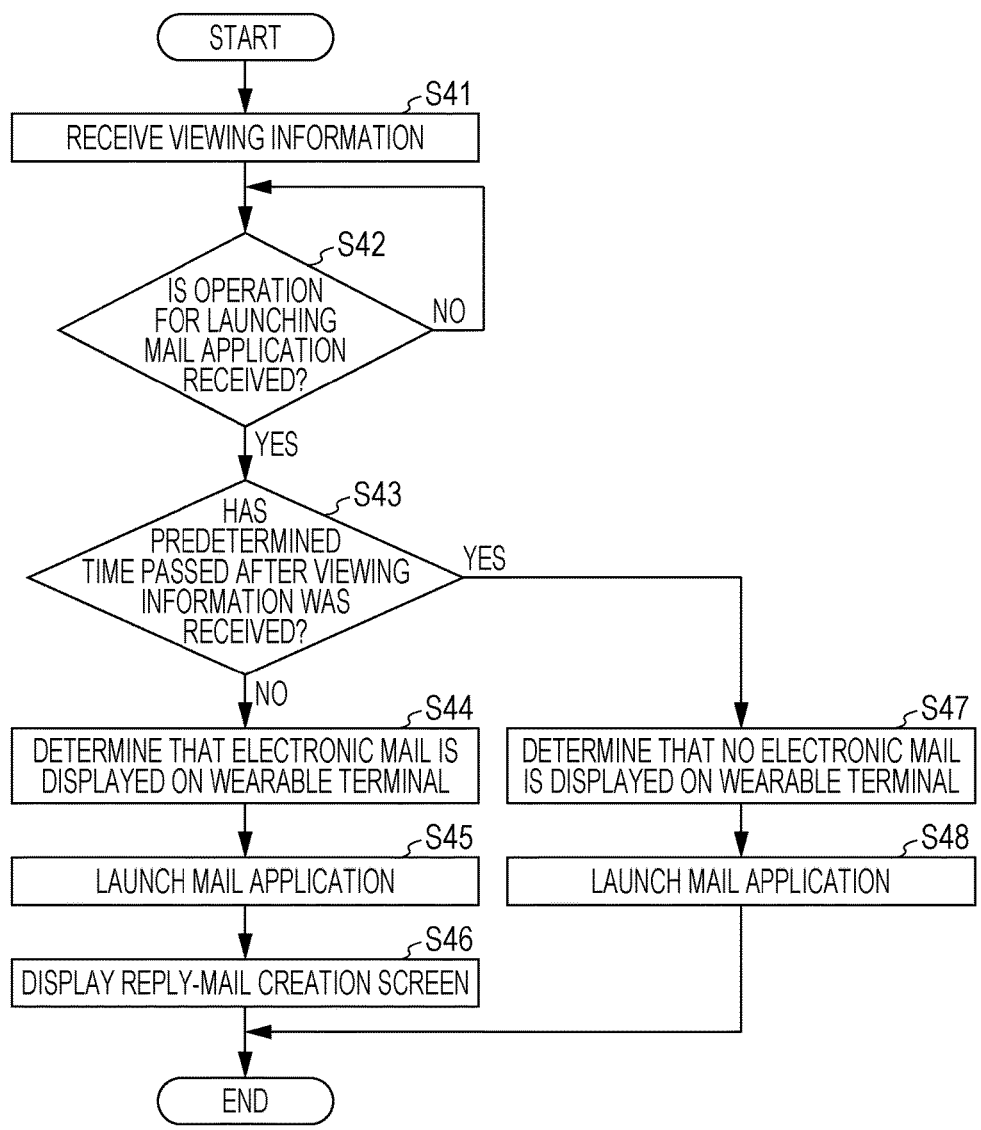
FIG. 9 is a flowchart illustrating the flow of processing for displaying a reply-mail creation screen in the information terminal according to the first embodiment.
Figure 10:
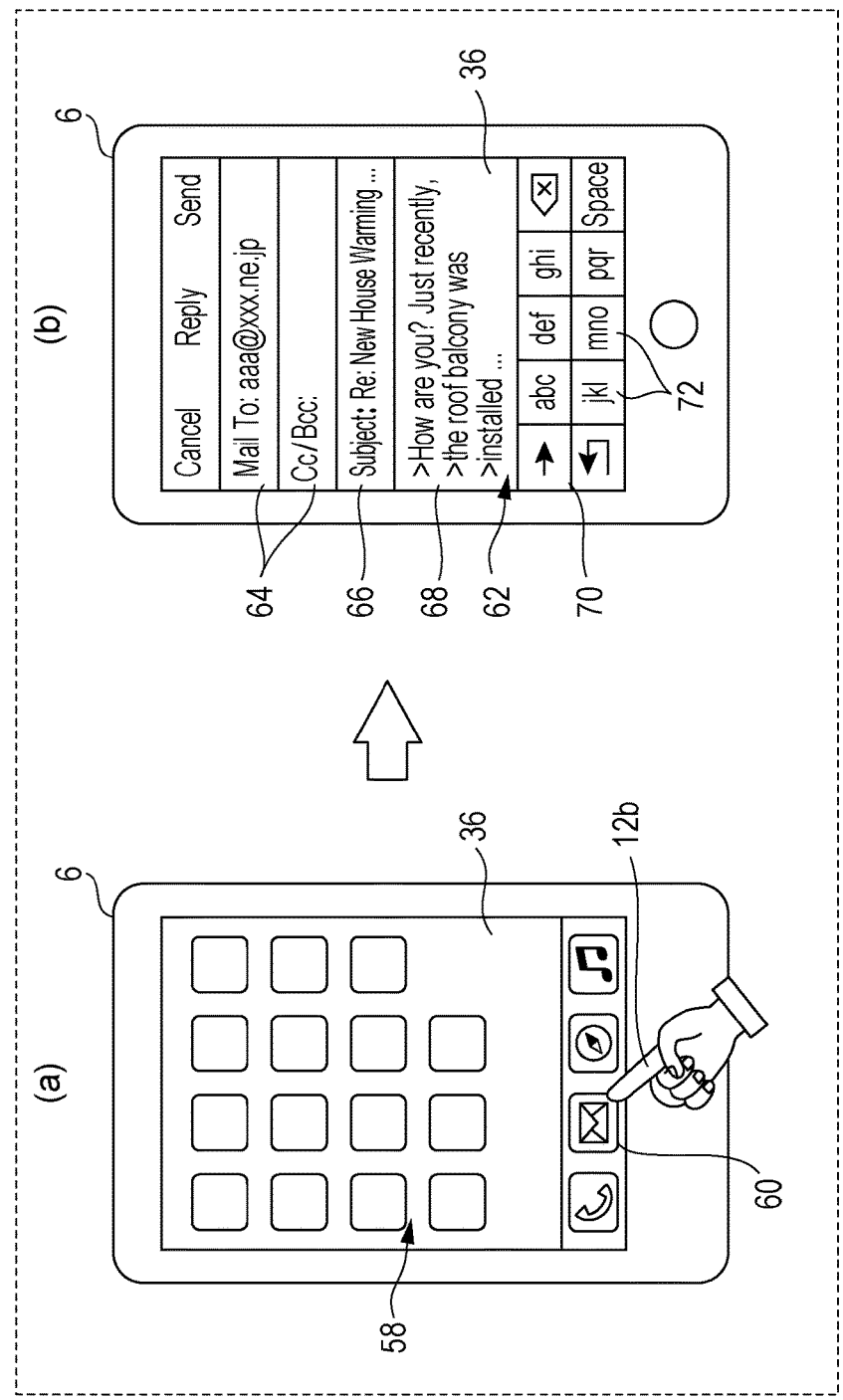
FIG. 10 is a view of one example of a home screen and the reply-mail creation screen displayed on a display unit of the information terminal according to the first embodiment.

Next, processing for displaying the reply-mail creation screen 62 (a method for controlling the information terminal 6) in the information display system 2 according to the first embodiment will be described with reference to FIGS. 7 to 10. This display processing is executed by the computer of the information terminal 6. FIG. 7 is a flowchart illustrating the flow of electronic-mail display processing in the wearable terminal 8 according to the first embodiment. FIG. 8 is a view of one example of the mail viewing screen 56 displayed on the display unit 52 of the wearable terminal 8 according to the first embodiment. FIG. 9 is a flowchart illustrating the flow of the processing for displaying the reply-mail creation screen 62 in the information terminal 6 according to the first embodiment. FIG. 10 is a view of one example of a home screen 58 and the reply-mail creation screen 62 displayed on the display unit 36 of the information terminal 6 according to the first embodiment.

When the input unit 50 of the wearable terminal 8 receives an operation, performed by the user 12, for displaying electronic mail (step S31 in FIG. 7), the mail viewing screen 56 is displayed on the display unit 52, as illustrated in FIGS. 7 and 8. The mail viewing screen 56 is a screen for displaying electronic mail received by the communication unit 46. When the user 12 selects an electronic mail he or she wishes to view on the mail viewing screen 56, the selected electronic mail (hereafter referred to as a "specific electronic mail") is displayed on the display unit 52 (step S32). During display of the specific electronic mail on the display unit 52, the wearable terminal 8 transmits viewing information associated with the specific electronic mail to the information terminal 6 (step S33). The transmission of the viewing information is periodically executed (step S33) until the display of the specific electronic mail is finished (NO in step S34).

Such viewing-information transmission method may be replaced with, for example, a viewing-information transmission method as described below. That is, when the user 12 performs a predetermined operation on the information terminal 6, the information terminal 6 transmits, to the wearable terminal 8, a transmission request notification for requesting transmission of viewing information. Based on the received transmission request notification, the wearable terminal 8 transmits the viewing information to the information terminal 6. Although, in the first embodiment, the wearable terminal 8 is adapted to transmit the viewing information to only the information terminal 6, the wearable terminal 8 may transmit the viewing information to both the information terminal 6 and the electronic mail server 4.

If the display of the specific electronic mail on the display unit 52 is finished (YES in step S34), the wearable terminal 8 suspends the transmission of the viewing information associated with the specific electronic mail (step S35). Possible examples of a case in which the display of the specific electronic mail is finished include a case in which the user 12 closes the mail viewing screen 56 and a case in which the user 12 selects another electronic mail on the mail viewing screen 56.

As illustrated in FIG. 9, while the specific electronic mail is displayed on the display unit 52 of the wearable terminal 8, the information terminal 6 receives the viewing information transmitted from the wearable terminal 8 (step S41 in FIG. 9). Thereafter, if the input unit 34 of the information terminal 6 receives an operation (a second operation), performed by the user 12, for launching the mail application (YES in step S42), the determiner 38 determines whether or not the specific electronic mail is displayed on the display unit 52 of the wearable terminal 8 (step S43), based on the received viewing information.

In this case, the operation, performed by the user 12, for launching the mail application, is performed, for example, in the following manner. In a state in which the home screen 58 is displayed on the display unit 36 of the information terminal 6, when the user 12 taps (specifies) an icon 60 (i.e., an icon for launching the mail application) on the home screen 58 with his or her finger 12b, as illustrated in FIG. 10(a), the mail application is launched.

When the display unit 36 is not a touch panel display, for example, the user 12 may specify the icon 60 on the home screen 58 by operating an input button (not illustrated), which is a physical button provided on the information terminal 6.

If the predetermined time (e.g., 20 seconds) has not passed after the information terminal 6 received the viewing information (NO in step S43), the determiner 38 determines that the specific electronic mail is displayed on the display unit 52 of the wearable terminal 8 (step S44). In this case, the controller 40 in the information terminal 6 launches the mail application (step S45) based on the result of the determination made by the determiner 38 and causes the reply-mail creation screen 62 to be automatically displayed on the display unit 36 (i.e., without the user 12 performing any operation on the information terminal 6) (step S46).

As illustrated in FIG. 10(b), the reply-mail creation screen 62 is a screen for creating a reply mail to the specific electronic mail (see FIG. 8) displayed on the display unit 52 of the wearable terminal 8. The reply-mail creation screen 62 has a destination-address input field 64, a subject input field 66, a body-text input field 68, and a software keyboard 70. The destination-address input field 64 is an input field for inputting a mail address that is the destination address of a reply mail. The subject input field 66 is an input field for inputting a subject of the reply mail. The body-text input field 68 is an input field for inputting body text of the reply mail. The software keyboard 70 has a plurality of input keys 72, arranged in a lattice, for inputting characters on the reply-mail creation screen 62.

As illustrated in FIG. 10(b), the reply-mail creation screen 62 is displayed on the display unit 36, with the mail address of the transmission source of the specific electronic mail to which a reply is to be made being pre-input in the destination-address input field 64, with a subject including the subject of the specific electronic mail being pre-input in the subject input field 66, and with the body text of the specific electronic mail being pre-input in the body-text input field 68 in a quoted form.

By operating the software keyboard 70 on the reply-mail creation screen 62, the user 12 can create a reply mail to the specific electronic mail displayed on the display unit 52 of the wearable terminal 8.

In step S46, when the destination address of the specific electronic mail displayed on the display unit 52 of the wearable terminal 8 includes a plurality of mail addresses, one or more mail addresses other than the mail address corresponding to the information terminal 6 among the plurality of mail addresses may be pre-input in the destination-address input field 64, instead of the mail address of the transmission source of the specific electronic mail.

On the other hand, if the predetermined time has passed after the information terminal 6 received the viewing information (YES in step S43), the determiner 38 determines that no specific electronic mail is displayed on the display unit 52 of the wearable terminal 8 (step S47). In this case, based on the result of the determination made by the determiner 38, the controller 40 in the information terminal 6 launches the mail application (step S48). In this case, the reply-mail creation screen 62 is not displayed on the display unit 36, and a received-mail box screen (not illustrated), which is a screen for a list of received electronic mails, is displayed on the display unit 36.

1-6. Advantages

Next, a description will be given of advantages offered by the information display system 2 according to the first embodiment. As described above, when the user 12 wishes to create a reply mail to a specific electronic mail displayed on the display unit 52 of the wearable terminal 8, he or she performs an operation for launching the mail application on the information terminal 6 (e.g., an operation of tapping the icon 60). In this case, when the determiner 38 determines that a specific electronic mail is displayed on the display unit 52 of the wearable terminal 8, and the mail application is launched, the reply-mail creation screen 62 is automatically displayed on the display unit 36.

Accordingly, it is possible to display the reply-mail creation screen 62 on the display unit 36 of the information terminal 6 without performing a number of operations on the information terminal 6. As a result, the time from when the electronic mail is viewed on the wearable terminal 8 until the creation of a reply mail is started on the reply-mail creation screen 62 can be reduced, thus making it possible to enhance the operability of the information terminal 6.

Second Embodiment 2-1. Processing for Displaying Reply-Mail Creation Screen

Figure 11:
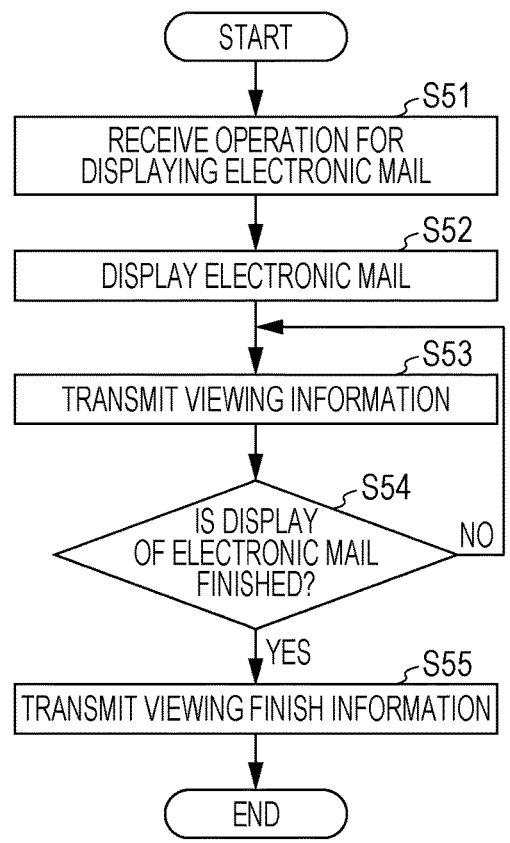
FIG. 11 is a flowchart illustrating the flow of electronic-mail display processing performed by a wearable terminal according to the second embodiment.
Figure 12:
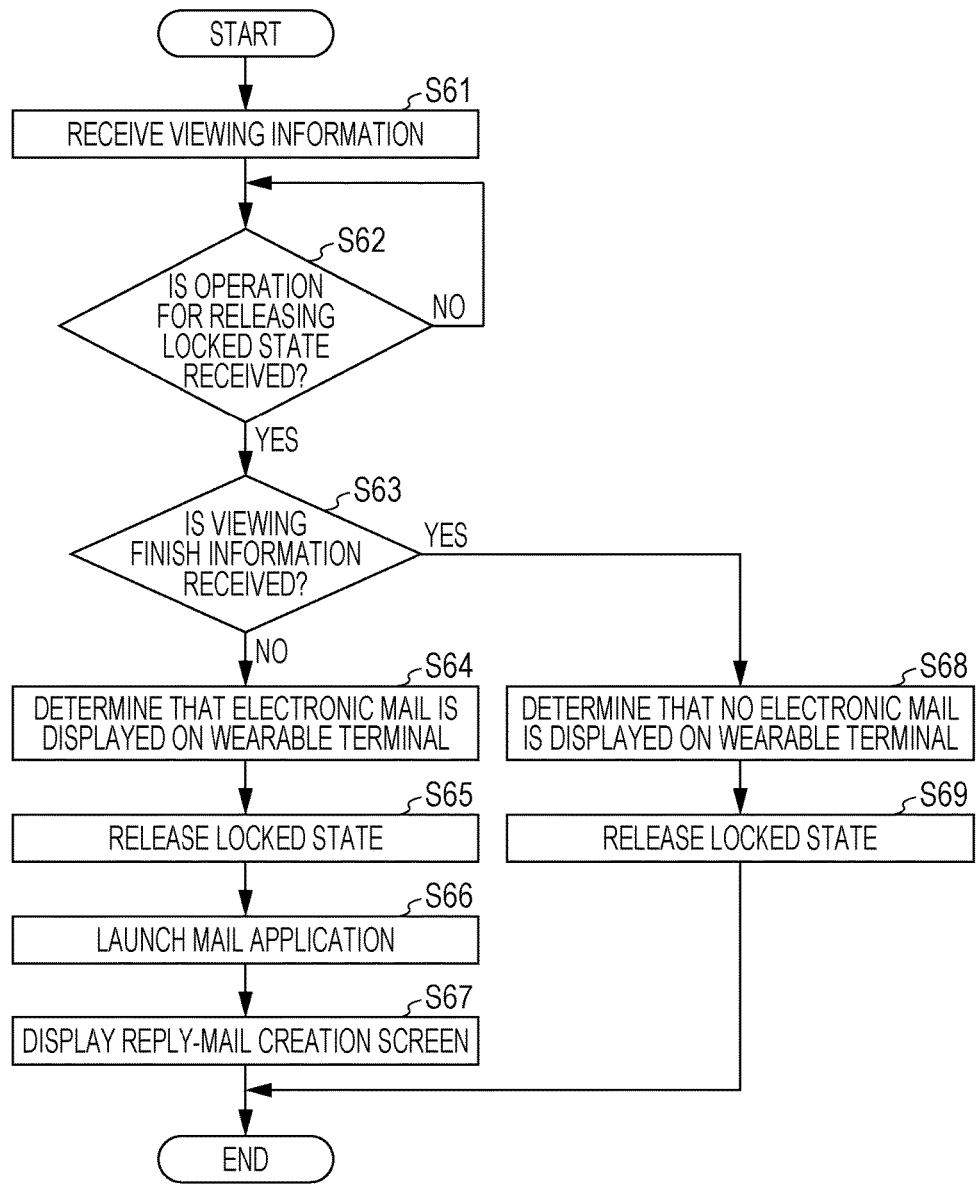
FIG. 12 is a flowchart illustrating the flow of processing for displaying the reply-mail creation screen in an information terminal according to the second embodiment.
Figure 13:
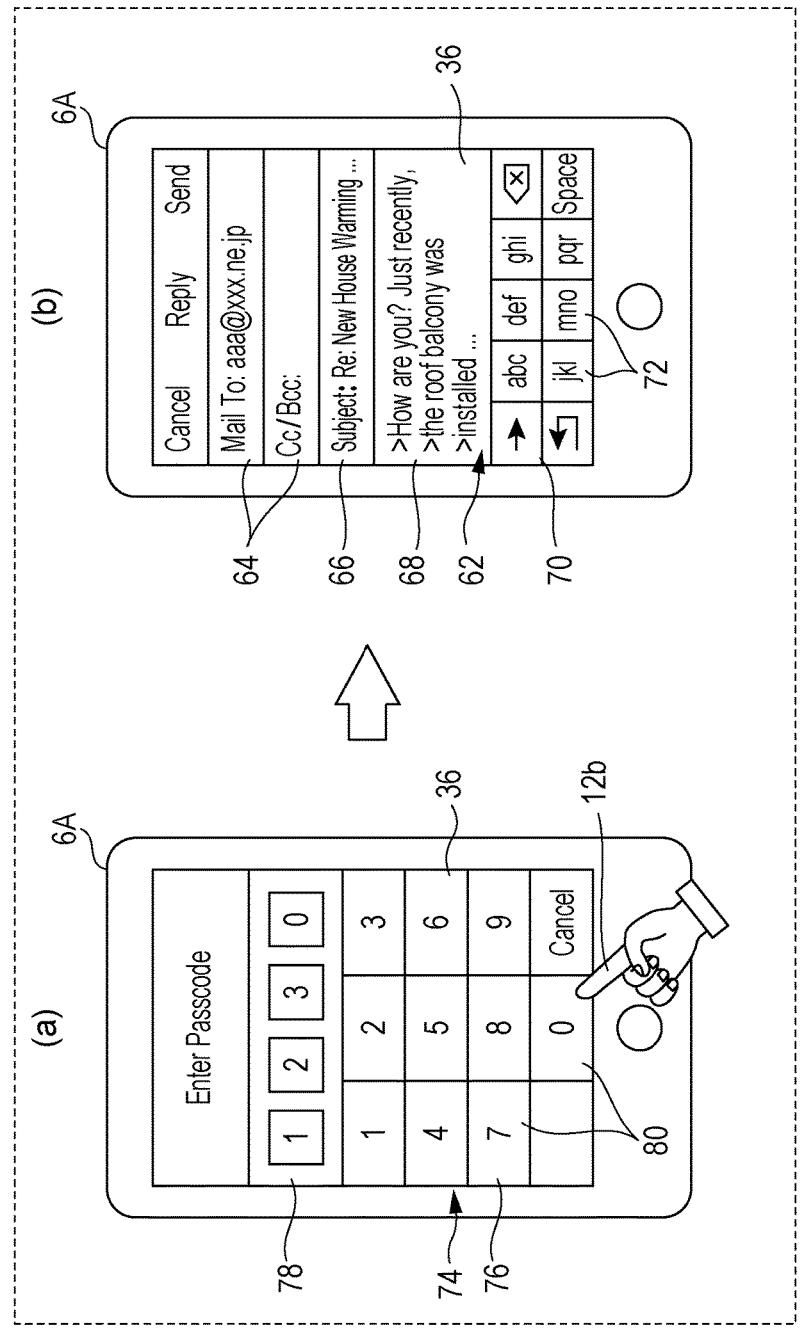
FIG. 13 is a view of one example of a passcode input screen and the reply-mail creation screen displayed on a display unit of the information terminal according to the second embodiment.

Next, processing for displaying the reply-mail creation screen 62 in an information display system 2A (see FIG. 1) according to a second embodiment will be described with reference to FIGS. 11 to 13. FIG. 11 is a flowchart illustrating the flow of electronic-mail display processing performed by a wearable terminal 8A according to the second embodiment. FIG. 12 is a flowchart illustrating the flow of processing for displaying the reply-mail creation screen 62 in an information terminal 6A according to the second embodiment. FIG. 13 is a view of one example of a passcode input screen 74 and the reply-mail creation screen 62 displayed on the display unit 36 of the information terminal 6A according to the second embodiment. In each embodiment described below, constituent elements that are the same as or similar to those in the first embodiment are denoted by the same reference numerals, and descriptions thereof are not given hereinafter.

The second embodiment and the first embodiment described above differ from each other in the processing for displaying the reply-mail creation screen 62. The following description will mainly be given of differences between the second embodiment and the first embodiment described above.

As illustrated in FIG. 11, steps S51 to S54 are executed, as in steps S31 to S34 in FIG. 7 described above in the first embodiment. If the display of the specific electronic mail on the display unit 52 of the wearable terminal 8A (see FIG. 1) is finished (YES in step S54 in FIG. 11), the wearable terminal 8A suspends the transmission of the viewing information associated with the specific electronic mail and transmits viewing finish information associated with the specific electronic mail to the information terminal 6A (step S55). The viewing finish information indicates that the display of the electronic mail on the display unit 52 is finished. The viewing finish information includes identification information (e.g., information, such as reception date and time) of the electronic mail displayed on the display unit 52 and is associated with the electronic mail on a one-to-one basis.

While the specific electronic mail is displayed on the display unit 52 of the wearable terminal 8A, the information terminal 6A receives viewing information transmitted from the wearable terminal 8A (step S61 in FIG. 12). Thereafter, if the input unit 34 of the information terminal 6A receives an operation (a first operation), performed by the user 12, for releasing a locked state of the information terminal 6A (YES in step S62), the determiner 38 determines whether or not a specific electronic mail is displayed on the display unit 52 of the wearable terminal 8A, based on the received viewing information and viewing finish information (step S63). The locked state of the information terminal 6A is a state in which operations (operations other than input of a passcode described below) on the information terminal 6A are disabled.

The operation, performed by the user 12, for releasing the locked state of the information terminal 6A, is performed, for example, in the following manner. When the passcode input screen 74 is displayed on the display unit 36 of the information terminal 6A, as illustrated in FIG. 13(a), the information terminal 6A is in the locked state. The passcode input screen 74 has a software keyboard 76 and a passcode input field 78. The software keyboard 76 has a numeric keypad 80 for inputting a passcode (e.g., 4-digit numbers) in the passcode input field 78. A passcode for releasing the locked state of the information terminal 6A is stored in the storage unit 32 (see FIG. 3) of the information terminal 6A. When the passcode stored in the storage unit 32 and the passcode input in the passcode input field 78 by the user 12 match each other, the locked state of the information terminal 6A is released. As a result of the release of the locked state of the information terminal 6A, the home screen 58 (see FIG. 10(a)) is displayed on the display unit 36, and an operation on the information terminal 6A is permitted.

If the information terminal 6A does not receive the viewing finish information (NO in step S63), the determiner 38 (see FIG. 3) determines that a specific electronic mail is displayed on the display unit 52 of the wearable terminal 8A (step S64). In this case, the controller 40 (see FIG. 3) in the information terminal 6A releases the locked state of the information terminal 6A based on the result of the determination made by the determiner 38 (step S65) and launches the mail application (step S66). Thereafter, the controller 40 in the information terminal 6A causes the reply-mail creation screen 62 to be automatically displayed on the display unit 36, as illustrated in FIG. 13(b) (step S67).

On the other hand, if the information terminal 6A receives the viewing finish information (YES in step S63), the determiner 38 determines that no electronic mail is displayed on the display unit 52 of the wearable terminal 8A (step S68). In this case, based on the result of the determination made by the determiner 38, the controller 40 in the information terminal 6A releases the locked state of the information terminal 6A (step S69). In this case, the mail application is not launched, and the home screen 58 is displayed on the display unit 36.

2-2. Advantages

The information display system 2A according to the second embodiment can also offer advantages that are the same as or similar to those in the first embodiment described above.

Although, in the second embodiment, the operation for inputting a passcode in the information terminal 6A is used as the operation for releasing the locked state of the information terminal 6A, the present disclosure is not limited thereto. For example, an operation for inputting a gesture in the information terminal 6A by using the finger 12b may also be used.

Third Embodiment

3-1. Processing for Displaying Reply-Mail Creation Screen

Figure 14:
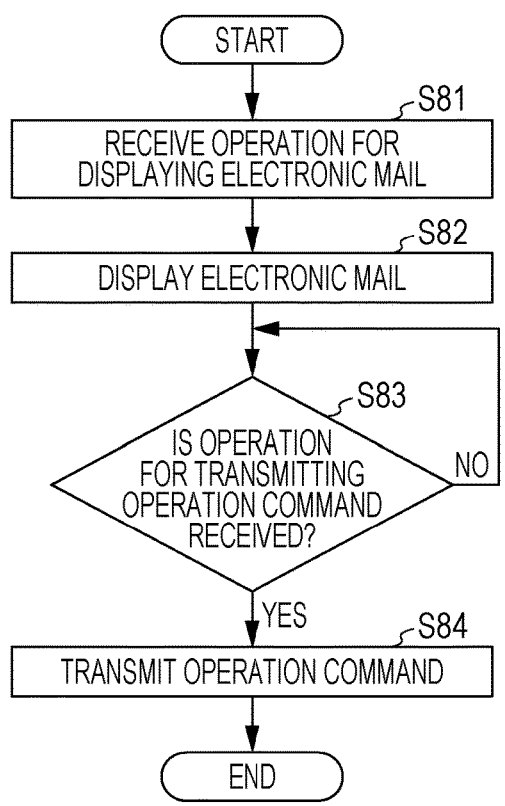
FIG. 14 is a flowchart illustrating the flow of electronic-mail display processing in a wearable terminal according to the third embodiment.
Figure 15:
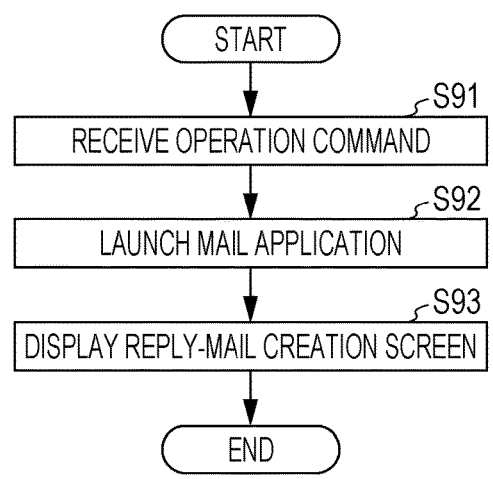
FIG. 15 is a flowchart illustrating the flow of processing for displaying the reply-mail creation screen in an information terminal according to the third embodiment.

Next, processing for displaying the reply-mail creation screen 62 (see FIG. 10(*b*)) in an information display system 2B (see FIG. 1) according to a third embodiment will be described with reference to FIGS. 14 and 15. FIG. 14 is a flowchart illustrating the flow of electronic-mail display processing in a wearable terminal 8B according to the third embodiment. FIG. 15 is a flowchart illustrating the flow of processing for displaying the reply-mail creation screen 62 in an information terminal 6B according to the third embodiment.

In the information display system 2B according to the third embodiment, processing for displaying the reply-mail creation screen 62 is executed in addition to the above-described processing for displaying the reply-mail creation screen 62 in the first embodiment.

As illustrated in FIG. 14, steps S81 and S82 are executed, as in steps S31 and S32 in FIG. 7 described above in the first embodiment. Thereafter, in a state in which the specific electronic mail is displayed on the display unit 52 (see FIG. 5) of the wearable terminal 8B (see FIG. 1), when the input unit 50 (see FIG. 5) of the wearable terminal 8B receives an operation, performed by the user 12, for transmitting an operation command (YES in step S83 in FIG. 14), the wearable terminal 8B transmits the operation command to the information terminal 6B (see FIG. 1) (step S84). The operation command gives an instruction for displaying, on the display unit 36 (see FIG. 3) of the information terminal 6B, the reply-mail creation screen 62 for creating a reply mail to the specific electronic mail.

Upon receiving the operation command transmitted from the wearable terminal 8B (step S91 in FIG. 15) the controller 40 (see FIG. 3) in the information terminal 6B launches the mail application (step S92) and causes the reply-mail creation screen 62 to be automatically displayed on the display unit 36 (step S93).

3-2. Advantages

In the information display system 2B according to the third embodiment, when the user 12 performs an operation on the wearable terminal 8B in a state in which a specific electronic mail is displayed on the display unit 52 of the wearable terminal 8B, the reply-mail creation screen 62 is automatically displayed on the display unit 36. Thus, the reply-mail creation screen 62 can be displayed on the information terminal 6B in response to an instruction from the wearable terminal 8B.

Other Modifications

Although the information terminal control method according to one or more aspects has been described based on the first to third embodiments described above, the present disclosure is not limited to the first to third embodiments. Modes obtained by applying various modifications conceived by those skilled in the art to the first to third embodiments or modes constituted by combining the constituent elements in different embodiments or modifications may also be encompassed by the scope of one or more aspects, as long as such modes do not depart from the spirit and scope of the present disclosure.

Although, in each embodiment described above, each of the information terminals 6, 6A, and 6B is implemented by a smartphone, the present disclosure is not limited thereto. For example, each of the information terminal 6, 6A, and 6B may be implemented by a mobile phone, a tablet terminal, a personal computer, or the like.

Although, in each embodiment described above, each of the wearable terminals 8, 8A, and 8B is implemented by a wristwatch-type terminal, the present disclosure is not limited thereto. For example, each of the wearable terminals 8, 8A, and 8B may be implemented by an eyeglass-type terminal, a pendant-type terminal, or the like.

Although a case in electronic mail (E mail) is transmitted/received has been described in each embodiment described above, the present disclosure is not limited thereto and is applicable to, for example, a short message service (SMS) or a multimedia messaging service (MSM). The present disclosure is also applicable to a message service using a chat function.

For example, instead of the mail application in each embodiment described above, a message application that can provide an SMS, an MSM, or a chat service may be stored in the storage unit 32 in the information terminal 6, 6A, or 8B and in the storage unit 48 in the corresponding wearable terminal 8, 8A, or 8B. In such a case, various messages that the information terminal 6, 6A, or 63 receives using the message application are transferred to the corresponding wearable terminal 8, 8A, or 8B. For example, upon launch of the message application in the information terminal 6, 6A, or 6B when various messages are displayed on the wearable terminal 8, 8A, or 8B, a reply-message creation screen for the various messages is displayed on the display unit 36 of the corresponding information terminal 6, 6A, or 8B.

The configuration of the reply-message creation screen in this case depends on the specifications of the message application. For example, when the message application executes communication in a chat form, a talk room for a talk with a user at the opposite end of the communication is generally formed. In the message application, for example, talk rooms corresponding to respective opposite ends of communications are displayed in a list, and when any of the talk rooms is selected, a screen on which message history of the selected talk room can be viewed is displayed on the display unit 36. On this screen, not only can the message history be viewed, but also a message for the opposite end of communication can be created. That is, the screen has a screen configuration that makes it possible to create a message while viewing the message history. In the following description, a screen having such a screen configuration is hereinafter referred to as a "talk room screen", for convenience of description.

In a message application having the above-described specifications, the reply-message creation screen may be the talk room screen. The configuration of the talk room screen may include an image for displaying the message history and an image indicating a text box in which a message can be created. In this case, the talk room screen does not necessarily have to include the software keyboard 70 for inputting text. The talk room screen may have a configuration in which a software keyboard is displayed upon an arbitrary operation on the information terminal 6, 6A, or 6B.

In addition, the talk room screen may have a button icon for starting input of a voice message from a user.

In the first to third embodiments described above, the individual constituent elements may be constituted by dedicated hardware or may be realized by executing a software program suitable for each constituent element. A program executor, such as a CPU or a processor, may read and execute a software program recorded in a storage medium, such as a hard disk or a semiconductor memory, to thereby realize the constituent elements.

The present disclosure also encompasses cases as described below.

(1) Each device described above can be implemented by, specifically, a computer system including a microprocessor, a read-only memory (ROM), a RAM, a hard disk unit, a display unit, a keyboard, a mouse, and so on. A computer program is stored in the RAM or the hard disk unit. The microprocessor operates in accordance with the computer program, so that each device realizes its functions. The computer program in this case is made of a combination of a plurality of instruction codes for giving instructions to a computer in order to achieve a predetermined function.

(2) Some or all of the constituent elements included in each device described above may be implemented by one system large scale integration (LSI). The system LSI is a super-multifunctional LSI circuit manufactured by integrating a plurality of constituent elements on one chip and is, specifically, a computer system including a microprocessor, a ROM, a RAM, and so on. The computer program is stored in the ROM. The microprocessor loads the computer program from the ROM into the RAM and performs operations, such as an arithmetic operation, in accordance with the loaded computer program, so that the system LSI realizes its functions.

(3) Some or all of the constituent elements included in each device described above may be implemented by an integrated circuit (IC) card or a single module that can be inserted into and removed from the device. The IC card or the module may be a computer system including a microprocessor, a ROM, a RAM, and so on. The IC card or the module may include the aforementioned super-multifunctional LSI. The microprocessor operates in accordance with the computer program, so that the IC card or the module realizes its functions. The IC card or the module may be tamper-proof.

(4) The present disclosure may also be implemented by the methods described above. Those methods may also be realized by a computer program implemented by a computer or may be realized using digital signals provided by the computer program.

In the present disclosure, the computer program or the digital signals may be recorded on computer-readable storage media, for example, a flexible disk, a hard disk, a CD-ROM, a magneto-optical (MO) disk, a digital versatile disk (DVD), a DVD-ROM, a DVD-RAM, a Blu-Ray® Disc (BD), and a semiconductor memory. Those methods may also be realized by the digital signals recorded on the storage media.

Additionally, in the present disclosure, the computer program or the digital signals may be transmitted over a telecommunication channel, a wireless or wired communication channel, a network typified by the Internet, data broadcasting, or the like.

Moreover, the present disclosure may be realized by a computer system including a microprocessor and a memory, the memory may store the computer program, and the microprocessor may operate in accordance with the computer program.

The present disclosure may also be implemented by another independent computer system by transporting the storage medium on which the program or the digital signals are recorded or transferring the program or the digital signals over the network or the like.

(5) The above-described embodiments and the modifications may also be combined together.

The technology disclosed herein is useful for an information display system or the like in which an information terminal and a wearable terminal are made to cooperate with each other.

What is claimed is:

1. A control method for an information terminal that is configured to communicate with an electronic mail server and a wearable terminal used while being worn on a portion of a user's body, the information terminal having a first display, and the wearable terminal having a second display, the method causing a computer of the information terminal to:
receive electronic mail from the electronic mail server by using a mail application for executing transmission and reception of the electronic mail, the mail application being stored in a memory of the information terminal;
transfer the received electronic mail to the wearable terminal;
receive viewing information from the wearable terminal, the viewing information indicating that the electronic mail was displayed on the second display at a first time;
determine whether or not the electronic mail is being displayed on the second display at a second time, which is a predetermined period of time after the first time, based on the viewing information; and
automatically display, on the first display, a reply-mail creation screen for creating a reply mail to the electronic mail that was displayed on the second display at the first time, when it is determined that the electronic mail is being displayed on the second display, and the computer of the information terminal launches the mail application, and
automatically stop displaying, on the first display, the reply-mail creation screen at the second time when it is determined that the electronic mail is not being displayed on the second display.

2. The method according to claim 1, further causing the computer of the information terminal to:
launch the mail application and automatically display the reply-mail creation screen on the first display, when it is determined that the electronic mail is being displayed on the second display, and a first operation for releasing a locked state in which an operation on the information terminal is disabled is received.

3. The method according to claim 2,
wherein the first operation is an operation for inputting a passcode in the information terminal; and
wherein the method further causes the computer of the information terminal to
store a passcode for releasing the locked state in the memory of the information terminal; and
release the locked state when the passcode stored in the memory and the passcode input by the first operation match each other.

4. The method according to claim 1, further causing the computer of the information terminal to:
launch the mail application and automatically display the reply-mail creation screen on the first display, when it is determined that the electronic mail is being displayed on the second display, and a second operation for launching the mail application is received.

5. The method according to claim 4,
wherein the second operation specifies an icon for launching the mail application, the icon being displayed on the first display.

6. The method according to claim 1,
wherein it is determined that electronic mail is being displayed on the second display, until a predetermined time passes after the viewing information is received.

7. The method according to claim 1, further causing the computer of the information terminal to:
receive viewing finish information from the wearable terminal, the viewing finish information indicating that the display of the electronic mail on the second display is finished,
wherein it is determined that the electronic mail is being displayed on the second display, until the viewing finish information is received after the viewing information is received.

8. The method according to claim 1,
wherein the viewing information is periodically received while the electronic mail is being displayed on the second display.

9. The method according to claim 1,
wherein the reply-mail creation screen has a destination-address input field for inputting a mail address that is a destination address of a reply mail, and
wherein the method further causes the computer of the information terminal to
display the reply-mail creation screen on the first display, with a mail address of a transmission source of the electronic mail displayed on the second display being input in the destination-address input field.

10. The method according to claim 9, further causing the computer of the information terminal to:
display, when a destination address of the electronic mail displayed on the second display includes a plurality of mail addresses, the reply-mail creation screen on the first display, with one or more mail addresses other than a mail address corresponding to the information terminal among the plurality of mail addresses being input in the destination-address input field.

11. The method according to claim 9,
wherein the reply-mail creation screen has a subject input field for inputting a subject of a reply mail, and
wherein the method further causes the computer of the information terminal to
display the reply-mail creation screen on the first display, with a subject of the electronic mail displayed on at least the second display being input in the subject input field.

12. The method according to claim 1,
wherein the reply-mail creation screen has a body-text input field for inputting body text of a reply mail, and
wherein the method further causes the computer of the information terminal to
display the reply-mail creation screen on the first display, with body text of the electronic mail displayed on the second display being input in the body-text input field in a quoted form.

13. The method according to claim 1, further causing the computer of the information terminal to:
receive, from the wearable terminal, an operation command for giving an instruction for displaying the reply-mail creation screen on the first display; and
automatically display the reply-mail creation screen on the first display after the computer of the information terminal launches the mail application, when the operation command is received.

14. An information display system, comprising:
an information terminal that is configured to communicate with an electronic mail server; and
a wearable terminal that is used while being worn on a portion of a user's body and that is configured to communicate with the information terminal,
wherein the information terminal includes
a first display,
a memory that stores therein a mail application for executing transmission and reception of electronic mail,
a first receiver that receives the electronic mail from the electronic mail server by using the mail application, and
a transferer that transfers the received electronic mail to the wearable terminal;
the wearable terminal includes
a second receiver that receives the electronic mail from the information terminal,
a second display that displays the received electronic mail, and
a transmitter that transmits viewing information to the information terminal, the viewing information indicating that the electronic mail was displayed on the second display at a first time; and
the information terminal further includes
a third receiver that receives the viewing information from the wearable terminal,
a determiner that determines whether or not the electronic mail is being displayed on the second display of the wearable terminal at a second time, which is a predetermined period of time after the first time, based on the viewing information, and
a controller that automatically displays, on the first display, a reply-mail creation screen for creating a reply mail to the electronic mail that was displayed on the second display at the first time, when it is determined that the electronic mail is being displayed on the second display of the wearable terminal, and the computer of the information terminal launches the mail application, and automatically stop displaying, on the first display, the reply-mail creation screen at the second time when it is determined that the electronic mail is not being displayed on the second display.

15. A wearable terminal,
used in the information display system according to claim 14.

16. The wearable terminal according to claim 15,
wherein the transmitter in the wearable terminal transmits, to the information terminal, an operation command for giving an instruction for displaying the reply-mail creation screen on the first display.

17. A non-transitory storage medium storing a program for controlling an information terminal that is configured to communicate with an electronic mail server and with a wearable terminal used while being worn on a portion of a user's body, the information terminal having a first display, and the wearable terminal having a second display, the program, when executed, causing a computer of the information terminal to:
receive electronic mail from the electronic mail server by using a mail application for executing transmission and reception of the electronic mail, the mail application being stored in a memory of the information terminal;

transfer the received electronic mail to the wearable terminal;

receive viewing information from the wearable terminal, the viewing information indicating that the electronic mail was displayed on the second display at a first time;

determine whether or not the electronic mail is being displayed on the second display at a second time, which is a predetermined period of time after the first time, based on the viewing information; and automatically display, on the first display, a reply-mail creation screen for creating a reply mail to the electronic mail that was displayed on the second display at the first time, when it is determined that the electronic mail is being displayed on the second display, and the computer of the information terminal launches the mail application, and automatically stop displaying, on the first display, the reply-mail creation screen at the second time when it is determined that the electronic mail is not being displayed on the second display.

* * * * *